United States Patent [19]

Campagna

[11] Patent Number: 5,045,389

[45] Date of Patent: Sep. 3, 1991

[54] CARPET PADDING COMPRISING COVER FILM, AND PRIME AND REBOND FOAM LAYERS

[75] Inventor: Joseph A. Campagna, Budd Lake, N.J.

[73] Assignee: PMC, Inc., Sun Valley, Calif.

[21] Appl. No.: 527,176

[22] Filed: May 23, 1990

[51] Int. Cl.[5] .......................... B32B 3/26; B32B 5/22; B32B 5/32

[52] U.S. Cl. ............................... 428/316.6; 156/308.2; 428/95; 428/317.9; 428/327; 428/423.3

[58] Field of Search .................... 428/316.6, 317.9, 95, 428/327, 423.3; 156/308.2

[56] References Cited

U.S. PATENT DOCUMENTS

| | | | |
|---|---|---|---|
| 2,878,153 | 3/1959 | Hackländer | 428/310.5 |
| 3,576,706 | 4/1971 | Bauman et al. | 428/317.1 |
| 4,037,013 | 7/1977 | Sprague | 428/317.9 |
| 4,054,706 | 10/1977 | Sapiro | 428/316.6 |
| 4,336,089 | 6/1982 | Asperger | 156/152 |
| 4,374,885 | 2/1983 | Ikeda et al. | 428/316.6 |
| 4,385,131 | 5/1983 | Fracalossi et al. | 428/316.6 |

*Primary Examiner*—William J. Van Balen
*Attorney, Agent, or Firm*—Davis Hoxie Faithfull & Hapgood

[57] ABSTRACT

An improved carpet padding comprises a layer of rebonded flexible polyurethane foam, a relatively thin intermediate layer of flexible prime polyurethane foam, and a top layer of polymer film. The layers are laminated together by either a flame or liquid adhesive method. In a preferred embodiment, the bottom layer of rebonded foam is from two to eight times as thick as the intermediate layer of prime foam, and the top layer of polymer film is a metallized polyester embossed with a uniform pattern.

30 Claims, 2 Drawing Sheets

CARPET PADDING COMPRISING COVER FILM, AND PRIME AND REBOND FOAM LAYERS

BACKGROUND OF THE INVENTION

1. Field of the Invention

This invention relates to laminated carpet padding, and methods for its manufacture. More specifically, the laminated structure comprises a layer of rebonded flexible polyurethane foam, a relatively thin intermediate layer of flexible prime polyurethane foam, and a layer of polymer film.

2. Description of Related Art

Laminated structures for use as carpet padding, underlay, or cushioning material are known in the art. U.S. Pat. No. 4,037,013, issued July 19, 1977, discloses a rebonded, or particle, foam bottom layer laminated to a top layer of prime flexible polyurethane foam of equal or greater thickness; and also discloses a laminate of a rebonded foam bottom layer with a top layer of spun-bonded polyester fibers, and optionally, intermediate layers of polyethylene film.

U.S. Pat. No. 3,576,706 discloses a laminated carpet underlay of prime, or virgin, flexible polyurethane foam having certain specified physical properties and a facing or cover layer of self-sustaining thermoplastic film 0.5 to 10 mils thick, polyvinyl chloride apparently being preferred. The thermoplastic film facing layer has a relatively low coefficient of friction compared to the flexible foam, and its smooth surface facilitates laying a carpet over the underlay and also helps keep the carpet underlay from wrinkling under the carpet after extended use. In addition to laminating the self-sustaining film, a polyurethane resin facing sheet can be applied by a transfer coating process.

U.S. Pat. No. 4,336,089 discloses a method for simultaneously preparing a polyurethane foam carpet underlay with a barrier film of non-woven material on one surface by applying the film to the upper surface of the curing foam-forming mixture. The film can be polyvinylchloride, polyethylene, polypropylene, copolymers of these materials, nylon, and composites of these materials with non-woven material.

The production of carpet padding from rebonded flexible polyurethane foam is well known. Further, it is well established that carpet padding made of rebonded foam may have on its surface a top, or cover, layer of polymer film, laminated to the rebonded foam through application of heat or a liquid adhesive. The use of rebonded shredded foam is particularly desirable in that it provides an outlet for waste foam generated during production of foam or fabrication of finished items from foam pieces. Because it is usually produced in higher than standard foam densities, rebonded foam padding generally has particularly desirable wear properties. It is, however, also recognized that by its nature rebonded foam is not as uniform in density and surface contour as carpet padding prepared from prime, or virgin, polyurethane foam.

As noted above, the use of a thermoplastic polymer film on the upper surface of the underlay which contacts the back of the carpet is employed to facilitate installation. A cover film frequently used in the manufacture of carpet underlay is polyethylene, although other thermoplastic films can be applied. More recently, the use of a metallized polyester cover film has been adopted. The metallized cover film facilitates the dispersion of static electricity, and with proper grounding, can essentially eliminate the problem. Commercially available metallized polymer films include a 1.25 mm polyethylene (low density) film from Shaw Industries. It is also known to emboss the surface of the film with a repeating pattern, such as diamond-shaped or other geometric indentations. When a cover film is applied to rebonded foam, and particularly when the film's surface is embossed with such a uniform repeating pattern, the nonuniformities of the surface of the underlying rebonded foam become apparent. A cover film applied to rebonded foam generally has a nonuniform appearance, greater variation in cushioning and firmness, and a weaker bond between the film and the foam.

SUMMARY

The current invention covers a laminated carpet padding comprising a bottom layer of rebonded flexible polyurethane foam, a relatively thin intermediate layer of flexible prime polyurethane foam, and a top layer of polymer film which optionally can be a metallized film. The top film layer can be embossed with a pattern to provide a uniform and aesthetically pleasing appearance. The present invention provides the beneficial properties of rebonded foam, including extended wear and high density cushioning. But, unlike carpet padding consisting only of rebonded foam, the present invention provides an intermediate layer of flexible prime polyurethane foam which reduces the variation in physical properties of rebonded foam laminates of the prior art. Further, the present invention provides, as a top layer on the carpet padding, a polymer film which facilitates installation of the carpet and aids in preventing wrinkling in the padding after extended use. The laminate of the present invention's intermediate prime foam layer provides a surface for the cover film which is uniform and smooth, resulting in padding substantially uniform in surface contour, cushioning characteristics and aesthetic appearance.

DETAILED DESCRIPTION OF INVENTION

The laminated padding of this invention has three primary layers. The bottom layer is rebonded flexible polyurethane foam. The rebonded foam provides beneficial wear properties and cushioning support. Laminated to the rebonded foam layer is a relatively thin intermediate layer of flexible prime polyurethane foam. The prime foam layer provides more uniform physical properties, including a softer cushioning effect and a uniform surface for the application of the top layer of polymer film. The top layer of polymer film facilitates the installation of wall-to-wall carpet over the padding. The elements of foam and film comprising the laminated structure are securely joined to each other over their entire surface areas of contact. The layers can be joined by liquid adhesives applied by contact roll coating or other methods well known in the art. Alternatively, the layers can be joined by flame laminating methods where the surface of the polyurethane foam is softened to a tacky state and immediately pressed by means of compressor rolls or the like into contact with the adjacent layer. As a further alternative, the layers can be joined by means of thin films or non-woven webs of thermoplastic material which is softened by exposure to a heat source and then contacted by the layer to be joined.

Figure 1:
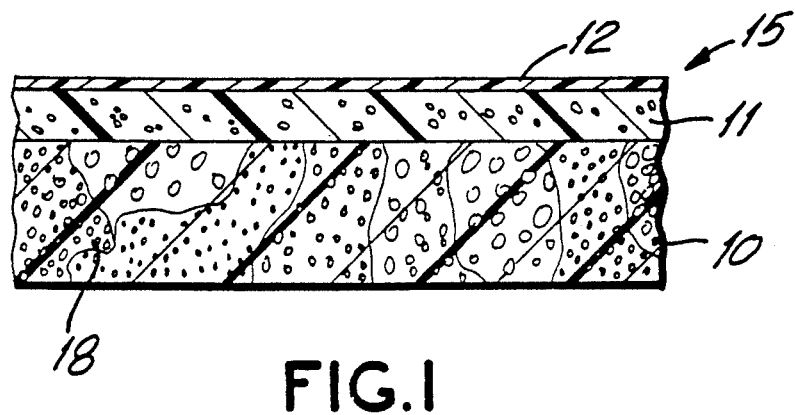
FIG. 1 is a cross section of a laminated carpet padding in accordance with the present invention.

FIG. 1 illustrates one embodiment of a laminated carpet padding 15 produced in accordance with the present invention. The bottom layer 10 of the carpet padding 15 consists of rebonded flexible polyurethane foam, preferably in the form of a web of the desired width of the finished underlay. In the manufacture of rebonded flexible polyurethane foam, representative foam particles 18 are bonded together with an adhesive in accordance with processes well-known in the art. The density of the rebonded foam layer can vary, and is dependent on the degree of cushioning desired. A preferred density for the rebonded foam layer is from about 3 to about 8 pounds per cubic foot. The rebonded foam layer preferably has a density at least about twice as great as the density of the intermediate layer of flexible prime polyurethane foam 11.

The thickness of the rebonded foam layer 10 usually is between 10 mm and 20 mm, or the rebonded foam layer 10 generally has a thickness greater than the intermediate layer of prime polyurethane foam 11. Preferably, the rebonded foam layer 10 is from about 3 to about 8 times as thick as the intermediate layer of prime polyurethane foam 11, and more preferably, the rebonded foam layer 10 is from about 2 to about 4 times as thick as the intermediate prime foam layer 11.

The intermediate foam layer 11 is a flexible prime, or Virgin, polyurethane foam material known in the art, also in the form of a web, which preferably is in roll form, and of the same width as layer 10. Various prime polyurethane foams are suitable for the present invention, including polyester and polyether polyurethane foams. A preferred density for the intermediate layer of prime foam is from about 0.9 to about 3 pounds per cubic foot. The intermediate layer of prime polyurethane foam 11 is bonded or laminated to the bottom layer 10 by either liquid adhesive or heat, including flame lamination techniques, both methods being well-known in the art.

The top layer of polymer film 12 can be laminated by heat or liquid adhesive applied between the intermediate layer 11 and polymer film 12. It is understood that following application of heat or liquid adhesives, pressure is applied by rolls or platens to insure the secure and uniform joining of the layers forming the laminate.

Figure 2:
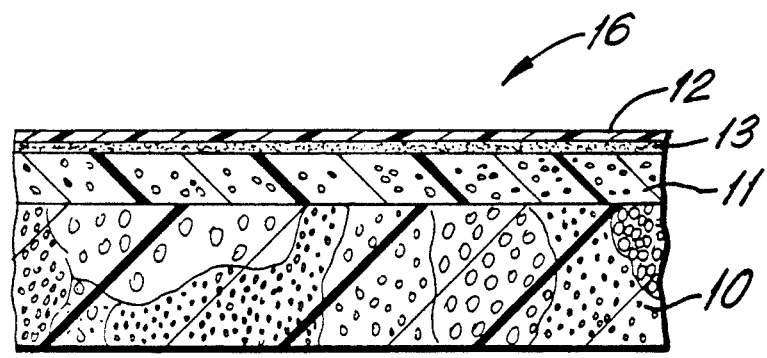
FIG. 2 is a cross section of an alternative embodiment of the present invention.

In FIG. 2, layers 10, 11, and 12 correspond to the materials of layers 10, 11, and 12 of FIG. 1. Further, layers 10 and 11 of FIG. 2 are laminated together in the manner described for layers 10 and 11 of FIG. 1.

FIG. 2 illustrates the use of an additional web 13 which is an intermediate thermoplastic polymer film, such as polyethylene, which serves as a hot-melt adhesive. When heated to its melting temperature, the intermediate film 13 acts as a bonding agent, holding the top film layer 12 and the intermediate foam layer 11 together. Intermediate film 13 can be either heat laminated or laminated by liquid adhesive to intermediate foam layer 11 and top film layer 12. Preferably, the intermediate film layer 13 is heat laminated to the intermediate foam layer 11, and then to the top film layer 12. The result, with the lamination of rebonded foam layer 10 to intermediate prime foam layer 11, is carpet padding 16.

The top, or cover, layer 12 is a polymer film. The top film layer 12 may also be a woven or non-woven material. Preferably, the top film layer 12 is a thermoplastic polymer to permit laminate formation by heating method. Suitable thermoplastic polymers for the top film layer 12 are, for example, polyethylene, polypropylene, polyvinyl acetate, polyvinyl chloride, polyester, polyamide, polybutadiene, polycarbonate, and copolymers thereof. Films that are not thermoplastic can be laminated by using liquid or hot melt adhesives. The top film layer 12 can be metallized. In a preferred embodiment, the top film layer 12 is a 1.25 mil thick metallized thermoplastic polyester film. Any other metallized thermoplastic film is suitable. Although thickness is not critical, and films from about 0.8 mil can be used, at least about 1 mil is desirable, and 1.25 mil thick film is preferred. Thicker films can be used to reduce flexibility of the laminate.

Figure 3:
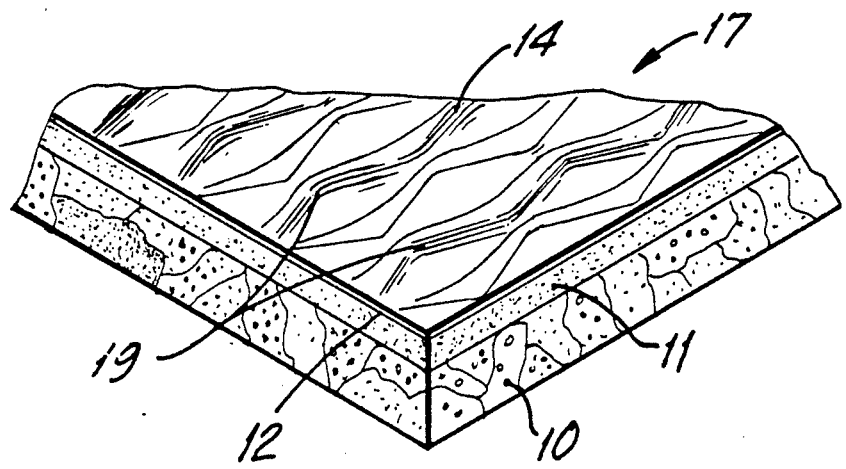
FIG. 3 is a partially sectioned, perspective view of a laminated carpet padding in accordance with the present invention.

FIG. 3 illustrates a surface 14 which represents an outer surface of top film layer 12 on carpet padding 17. Layers 10, 11, and 12 correspond to layers 10, 11, and 12 of FIGS. 1 and 2. In accordance With the invention, upper surface 14 can be embossed with a heated roller or platen to produce a repeating pattern 19. Methods and apparatus for embossing thermoplastic polymer films are known in the art. The embossing of surface 14 may be done subsequent to, or concurrently with, the bonding of the top layer of polymer film 12 to the intermediate layer of prime polyurethane foam 11.

Figure 4A:
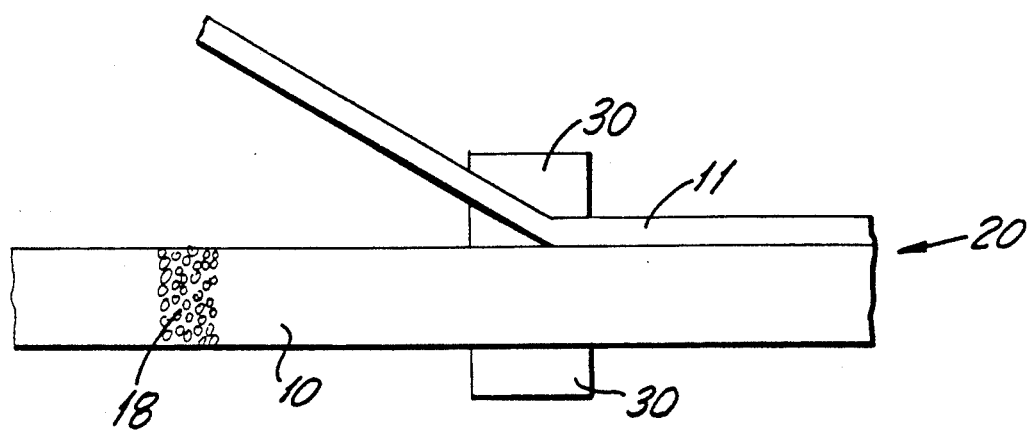
FIGS. 4A–C schematically illustrate an embodiment of the method of this invention.

The method of the current invention includes laminating the layers, as schematically illustrated in FIG. 1, as layers 10, 11, and 12, to form the completed carpet underlay material. In a preferred embodiment of the method illustrated in FIGS. 4A–4C, layers 10, 11, 12, and 13 correspond to layers 10, 11, 12, and 13 of FIG. 2. In FIG. 4A, rebonded foam layer 10 is laminated to the lower surface of intermediate prime foam layer 11 by passage through bonding means 30 to form laminate 20. The bonding means 30 can be either means for heat laminating or adhesively laminating the webs, both of which are well known in the art, and includes means for compressing the webs to insure a secure and uniform bond between the surfaces.

Figure 4B:
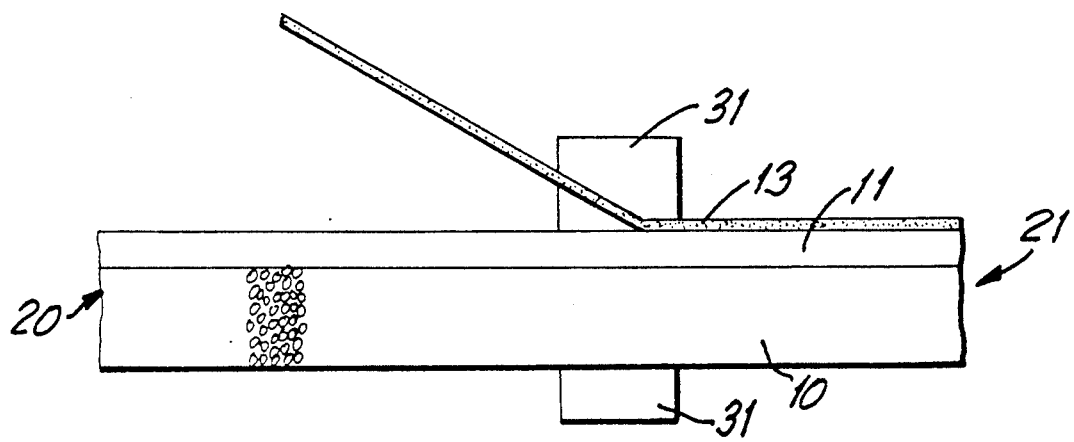

In FIG. 4B, prime foam layer 11 of laminate 20 is laminated to intermediate polymer film layer 13 by passage through bonding means 31 which also can be either a liquid adhesive or heat lamination method. In a preferred embodiment, heat lamination is employed. The result is laminate 21.

Figure 4C:
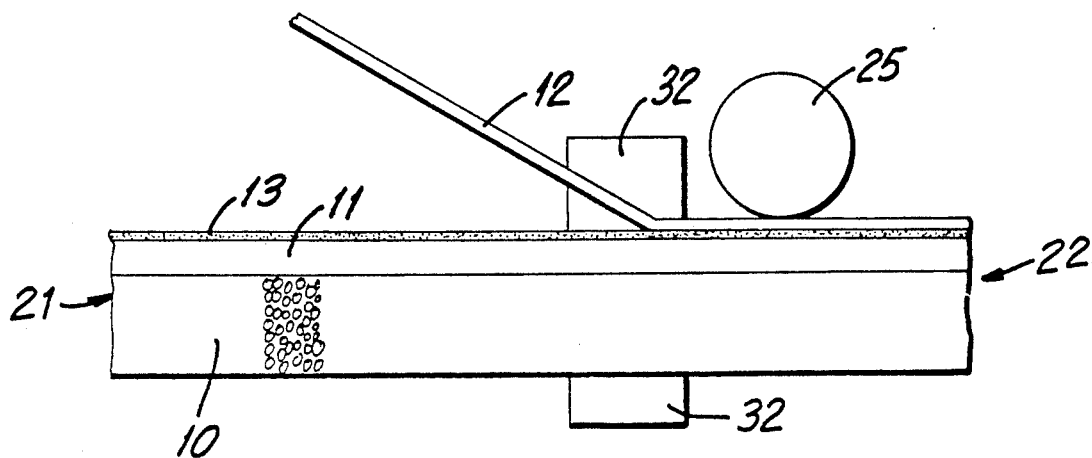

In FIG. 4C, intermediate polymer film layer 13 of laminate 21 is laminated to cover polymer film layer 12 by passage through bonding means 32. As with bonding means 30 and 31, bonding means 32 can be either liquid adhesive or heat lamination. Preferably, bonding means 32 is a method of heat lamination. Also shown in FIG. 4C is embossing roll 25. The laminated web 22 is passed through heated embossing roll 25 which embosses a repeating pattern 19, (as shown in FIG. 3), into cover film layer 12 concurrently with, or subsequent to, the lamination of top film layer 12 to intermediate film layer 13. The result is laminated carpet padding 22.

The means, and the sequence, employed to laminate the respective layers are not critical. A satisfactory product was produced according to the invention as follows: (1) the upper surface of a thin web (2.5 mm) of flexible prime polyester foam was flame laminated to a web of standard polyethylene film (about 1 mm); (2) to the lower surface of the prime polyester foam, a web of rebonded flexible polyurethane foam 10 mm thick was flame laminated; (3) thereafter, a metallized polyester film was flame laminated to the surface coated to which the standard polyethylene film had been bonded; and (4) concurrently with the application of the metallized polyester film, a uniform pattern was embossed into the metallized polyester film surface as the laminate was passed through a heated embossing roll. This order can be varied, for example, by bonding the bottom and intermediate layers by liquid adhesive applied by contact rolls, or reverse roll coating methods, and flame laminating the film to the upper surface of the intermediate prime foam layer.

Carpet padding produced by the method of the present invention possesses significant advantages in appearance, strength, and uniformity of physical properties, as compared to a laminate consisting of a polymer film and a layer of rebonded foam. These advantages will be apparent from the following data, where the "Laminate A" is a sample of material produced in accordance with the invention. In the Laminate A sample, the rebonded foam layer had a density of 3 pounds per cubic foot ("pcf"), and the intermediate layer of prime polyester foam had a density of 1.3 pounds per cubic foot. The top film layer of the Laminate A sample was an embossed 1.25 mil thermoplastic polyester film. The material identified as "Comparative" consisted of the same rebonded foam layer with a density of 3 pounds per cubic foot, and a top layer of embossed 1.25 mil thermoplastic polyester film.

A significant improvement afforded by the invention is in the physical appearance of the finished product. Because of the nonuniform composition of the rebonded foam, the Comparative sample presents a nonuniform or even "wrinkled" appearance compared to the Laminate A sample. In particular, where the Laminate A and Comparative samples have been embossed with uniform patterns, the surface contour of the Comparative sample appears especially uneven in contrast to the flat and uniform appearance of the Laminate A sample.

The ideal cushioning properties for high quality carpet underlay are a soft initial feel combined with high loadbearing support on further compression, to thereby avoid the feeling of bottoming out. To compare these properties, the compression force deflection (CFD) was measured at 25% indentation (softness) and at 65% indentation (support). Test Method ASTM D 3574-86 Sect. 30-36 was employed.

TABLE 1

|  | Laminate A | Comparative |
| --- | --- | --- |
| 25% (lbs/in.$^2$) | 0.694 | 0.992 |
| 65% (lbs/in.$^2$) | 5.150 | 5.056 |
| Ratio 65/25 | 7.42 | 4.09 |

As shown by this data, the overall comfort, as indicated by the "Ratio 65/25", is increased in the laminated underlay of the present invention.

Another improvement provided by the invention is a reduction in the variation in firmness over the surface area of the laminated carpet padding. Because of the inherent nonuniformity of rebonded foam, there is a relatively large variation in firmness in the Comparative sample when measured at various positions on the surface. Test Method ASTM D 3574-86 Sect. 30-36 was employed. In the Laminate A sample, the presence of the intermediate layer of flexible prime urethane foam reduces this variation considerably as shown by the standard deviation of five measurements used in obtaining the average results shown above in Table 1.

TABLE 2

|  | Standard Deviation | |
| --- | --- | --- |
| Std. Dev. | Laminate A | Comparative |
| 25% | 0.026 | 0.129 |
| 65% | 0.159 | 0.466 |

The method and product of the invention also provide for an improvement in the strength of the bond between the top polymer film and the underlying foam. In the Comparative sample, the bond between a polymer film and rebonded foam is not good because of the nonuniformity of the surface of the rebonded foam. The intermediate layer of prime foam of the current invention produces a significantly stronger bond for the film as shown by measuring "peel strength" on a 3 inch wide sample. Test Method ASTM D 3574-86 Sect. 53-60 was used to determine the force required to separate the film from the foam. The Laminate A sample withstood up to 1.8 lbs before delaminating, while the Comparative sample withstood only 1.4 lbs. Further, the "tear strength" of the Laminate A sample was much greater than that of the Comparative sample. Test Method ASTM D 3574-86 Sect. 53-60 was employed. The Laminate A sample withstood up to 6.6 lbs./in. while the Comparative sample withstood only up to 4.7 lbs./in.

The product of the invention exhibits an improved resistance to permanent indentation or penetration when compared to the laminate of the prior art. The intermediate prime foam layer improves resistance to permanent indentation or penetration of the cover polymer film (such as might be caused by contact with stiletto heels). To measure this property, observations were made of the effect of dropping a $\frac{3}{8}$ inch steel center punch weighing 65.2 grams from various heights (6 locations each), and the extent of the indentation and penetration were recorded. The results are as follows:

TABLE 3

| Height | Laminate A | | Comparative | |
| --- | --- | --- | --- | --- |
| (drop, inches) | Indent | Penetrate | Indent | Penetrate |
| 2 | v. slight | none | v. slight | none |
| 3 | slight | none | slight | none |
| 4 | slight | none | heavy | 3 of 6 |
| 5 | moderate | none | heavy | 3 of 6 |
| 6 | moderate | none | heavy | 3 of 6 |
| 7 | moderate | none | heavy | 3 of 6 |
| 12 | moderate | none | heavy | 3 of 6 |

I claim:

1. An improved laminated article adapted for use as carpet padding comprising a bottom layer of rebonded flexible polyurethane foam, an intermediate layer of flexible prime polyurethane foam and a top layer of polymer film.

2. The article of claim 1 where the bottom layer of rebonded polyurethane foam is from about 10 mm to about 20 mm thick.

3. The article of claim 1 where the bottom layer of rebonded foam is from about 3 to about 8 times as thick as the intermediate layer of prime foam.

4. The article of claim 1 where the bottom layer of rebonded foam is from about 2 to about 4 times as thick as the intermediate layer of prime foam.

5. The article of claim 1 where the top layer is a thermoplastic polymer film.

6. The article of claim 5 where the top layer of polymer film is selected from the group consisting of polyethylene, polypropylene, polyvinyl chloride, polyester, polyamide, polybutadiene, polycarbonate, polyvinyl acetate, and copolymers thereof.

7. The article of claim 1 where the top layer is a metallized thermoplastic polymer film.

8. The article of claim 7 where the top layer is a polyester film.

9. The article of claim 8 where the top layer is a metallized polyester film.

10. The article of claim 5 where the surface of the top layer of polymer film is embossed with a pattern.

11. The article of claim 1 where the layers are bonded together by heat lamination.

12. The article of claim 11 where the layers are bonded together by flame lamination.

13. The article of claim 11 which further comprises a layer of polyethylene film between the top layer of polymer film and the intermediate layer of prime foam.

14. The article of claim 1 where the layers are bonded together by liquid adhesive.

15. The article of claim 1 in which the density of the bottom layer of rebonded foam is from about 3 to about 8 pounds per cubic foot.

16. The article of claim 1 in which the density of the intermediate layer of prime foam is from about 0.9 to about 3 pounds per cubic foot.

17. The article of claim 1 in which the density of the bottom layer of rebonded foam is about 3 pounds per cubic foot and the density of the intermediate layer of prime foam is about 1.3 pounds per cubic foot.

18. The article of claim 1 in which the density of the bottom layer of rebonded foam is at least twice as great as the density of the intermediate layer of prime foam.

19. The article of claim 1 where the intermediate layer is a polyester polyurethane foam.

20. In the method of manufacturing a laminated carpet padding which comprises a top layer of polymer film and a bottom layer of rebonded flexible polyurethane foam, the improvement which comprises
   (a) laminating to the upper surface of a bottom layer of rebonded flexible polyurethane foam an intermediate layer of flexible prime polyurethane foam, and
   (b) laminating to the upper surface of the intermediate layer of prime polyurethane foam a polymer film layer to form the top layer of the carpet padding.

21. The method of claim 20 which further comprises embossing the upper surface of the top layer of polymer film.

22. The method of claim 20 in which the top layer is a thermoplastic polymer film.

23. The method of claim 20 where the layers are flame laminated.

24. The method of claim 20 which includes the further steps of
   (a) laminating an intermediate thermoplastic polymer film to the upper surface of the intermediate prime foam layer,
   (b) melting the intermediate polymer film, and
   (c) contacting the melted intermediate polymer film and the top polymer film layer to thereby bond the intermediate prime foam layer to the top polymer film layer.

25. The method of claim 24 in which the intermediate thermoplastic polymer film is polyethylene.

26. The method of claim 24 in which the top layer is a thermoplastic polymer film.

27. The method of claim 24 where the layers are flame laminated.

28. The method of claim 24 where the top polymer film is metallized which further comprises the step of embossing the upper surface of the top polymer film layer.

29. The method of claim 20 in which the bottom layer of rebonded foam has a density in the range of from about 3 to about 8 pounds per cubic foot.

30. The method of claim 29 in which the intermediate layer of prime foam has a density in the range of from about 0.9 to about 3 pounds per cubic foot.

* * * * *